United States Patent [19]

Nakamura et al.

[11] 4,176,928

[45] Dec. 4, 1979

[54] FOCUS DETECTING DEVICE

[75] Inventors: Kazuo Nakamura, Asaka; Masao Jyojiki, Tsurugashima, both of Japan

[73] Assignee: Asahi Kogaku Kogyo Kabushiki Kaisha, Tokyo, Japan

[21] Appl. No.: 861,089

[22] Filed: Dec. 15, 1977

[30] Foreign Application Priority Data

Dec. 15, 1976 [JP] Japan ................. 51-150432

[51] Int. Cl.² ............................................. G03B 7/08
[52] U.S. Cl. ........................................ 354/25; 354/31
[58] Field of Search ............... 354/25, 31; 352/140

[56] References Cited

U.S. PATENT DOCUMENTS

| 4,047,187 | 9/1977 | Mashimo et al. | 354/25 |
| 4,083,056 | 4/1978 | Nakamura et al. | 354/31 |

*Primary Examiner*—Russell E. Adams
*Attorney, Agent, or Firm*—Sughrue, Rothwell, Mion, Zinn and Macpeak

[57] ABSTRACT

A focus detecting device is disclosed for use in a photographic camera. The device includes two rows of photoelectric focus detecting elements juxtaposed on a substrate in a symmetrical relationship with respect to the center line between both rows of focus detecting elements and arranged to receive light reflected from an object to be photographed through an optical focussing lens system. One row of the focus detecting elements are connected to a dc power source through individual electrical switching elements having their gates coupled to the corresponding outputs of a first trigger pulse generator for generating a train of sequential trigger pulses and through a first common load resistor. Likewise, the other row of the focus detecting elements are connected to the dc power source through individual electrical switching elements having their gates coupled to the corresponding outputs of a second trigger pulse generator for generating a train of sequential trigger pulses synchronized with, or delayed or advanced by a predetermined time interval to, the trigger pulse train from the first generator and through a second common load resistor. The common connection of the first resistor to the one row of the detecting elements and the common connection of the second resistor to the other row of the detecting elements are connected to the corresponding inputs of a comparator. Thus, the focus condition of the object on both the rows of focus detecting elements is detected in accordance with an output from the comparator based on the upper-lower image coincidence method and/or the contrast method.

8 Claims, 21 Drawing Figures

FOCUS DETECTING DEVICE

BACKGROUND OF THE INVENTION

The present invention relates to a focus detecting device for use in a photographic camera.

Recently, there have been developed two typical focus detecting methods, one of which is a so-called upper-lower image coincidence method in which two oppositely polarized split images of an object created by the effect of wedge type prisms merge into a single image when the object is brought into focus, and the other of which is a so-called contrast method in which the contrast between mutually adjacent spot locations in the object's image becomes greatest when the image is in focus.

However, each of the aforesaid focus detecting methods has the disadvantage that it often results in an inaccurate focus detection or an erroneous focus detection in the worst case.

SUMMARY OF THE INVENTION

It is, therefore, an object of the invention to provide a novel type focus detection device capable of always positively detecting the most preferable focus condition or in-focus condition.

The object of the invention is attained by the provision of a focus detecting device characterized by comprising two groups of electrical switching elements having their gates and their main current conduction paths coupled to a dc power source via the two groups of corresponding electric focus detecting elements and corresponding common load resistors; trigger pulse generating means having a plurality of output terminals coupled to the corresponding gates of the two groups of photoelectric focus detecting elements, and producing a train of sequential trigger pulses capable of independently triggerring the two groups of focus detecting elements; comparator means having two input terminals coupled with the common connection of one of the load resistors to one group of the photoelectric focus detecting elements and the common connection of the other load resistor to the other group of the photoelectric focus detecting elements; and, means for detecting the focus condition of the object's image formed through an optical focussing lens system on both the groups of photoelectric focus detecting elements in accordance with an output signal from the comparator means.

DETAILED DESCRIPTION OF THE PREFERRED EMBODIMENT

Figure 1:
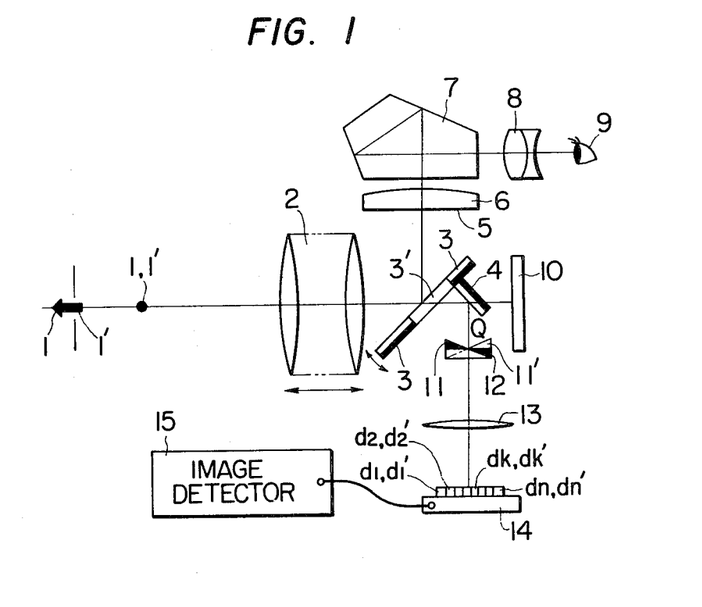
FIG. 1 is an explanatory diagram illustrating the optical arrangement of a single lens reflex camera including an image detecting device according to the present invention.

FIG. 1 is an explanatory diagram illustrating the optical arrangement of a single lens reflex camera including an image detecting device 15 (FIGS. 4 and 5) according to the present invention. The optical arrangement comprises an object 1, 1' to be photographed; a lens group 2 (hereinafter referred to as "photographing lens") forming the photographing optical system of the camera; a total reflection mirror 3 having a half mirror 3' at its central portion; a total reflection mirror 4; a focal plate 5; a condenser lens 6; a pentaprism 7; an eye piece 8; a photographer's eye 9; a film 10; wedge type prisms 11 and 11' so disposed at optically equivalent positions to the film 10 that they are sloped in opposite directions and have a contacting interface 12 therebetween; and a lens 13 (hereinafter referred to as "projecting lens") for focussing the object's image onto a photoelectric focus detecting element group 14 which comprises a plurality pairs of minute photoelectric conversion elements $d_1, d_2, \ldots d_k, \ldots d_n$ and $d_1', d_2', \ldots d_k', \ldots d_n'$ formed on a common semiconductor substrate S (FIG. 2) and each having a minute light receiving surface and which is coupled to the focus detecting device 15.

Figure 2:
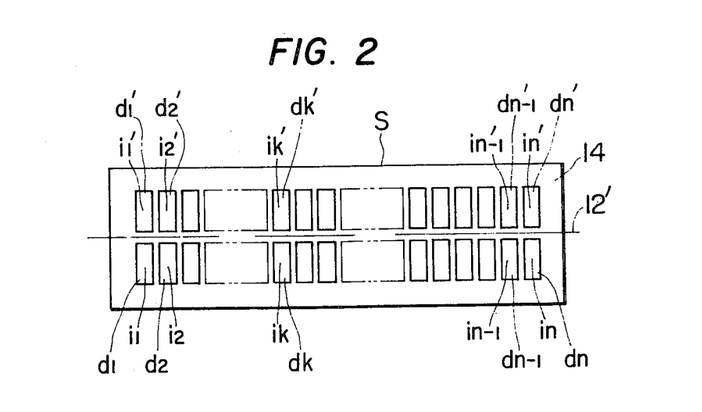
FIG. 2 is a plan view showing the arrangement of two groups of photoelectric conversion elements formed on a common substrate.
Figure 3:
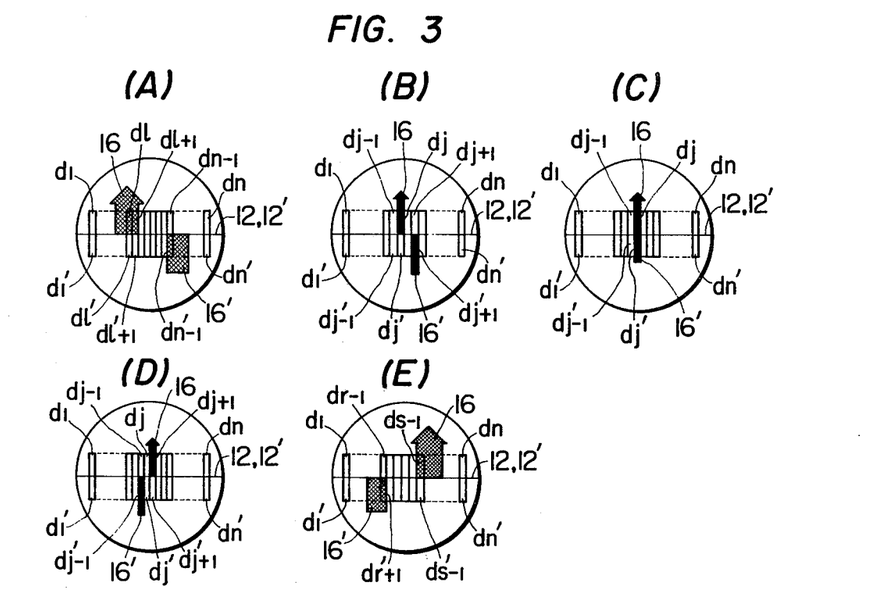
FIGS. 3A, 3B, 3D and 3E are diagrams illustrating the different images of an object formed on the two groups of photoelectric conversion elements shown in FIG. 2 when the object's image is out of focus.
FIG. 3C is a diagram illustrating the image of an object formed on the two groups of photoelectric conversion elements shown in FIG. 2 when the object's image is in focus.

FIG. 2 is a diagram illustrating the arrangement of the photoelectric conversion elements $d_1$ to $d_n$ and $d_1'$ to $d_n'$. Namely, the minute photoelectric conversion elements $d_1$ and $d_1'$, $d_2$ and $d_2'$ ... $d_k$ and $d_k'$ ... and $d_n$ and $d_n'$ such as photodiodes, phototransistors or the like are confronted or paired with each other by symmetrically positioning them on opposite sides of a central line 12' on the substrate S so as to have the same electrical characteristics and the light receiving area. In FIG. 2, reference characters $i_1, i_2, \ldots i_k \ldots i_n$ and $i_1', i_2' \ldots i_k' \ldots i_n'$ designate output currents proportional to incident light quantities applied to the corresponding photoelectric conversion elements $d_1, d_2, \ldots d_k \ldots d_n$ and $d_1', d_2', \ldots d_k' \ldots d_n'$.

FIGS. 3A to 3E illustrate the images of the object 1, 1' projected onto the photoelectric focus detecting element group 14 through the photographing lens 2, the wedge type prisms 11, 11' and the projecting lens 13. More specifically, the photoelectric focus detecting element group 14 is so arranged that the two split images formed by the wedge type prisms 11, 11' fall thereon with the upper half image 16 falling on the upper group of photoelectric conversion elements $d_1$ to $d_n$ and the lower half image 16' falling on the lower group of photoelectric conversion elements $d_1'$ to $d_n'$.

Thus, FIG. 3C shows the image of the object on the photoelectric focus detecting element group 14 in the case where the object's image is brought into focus; while FIGS. 3A, 3B, 3D and 3E show the different images of the object on the element group 14 in the case where the object's images are not brought into focus. Hence, the degrees of out-of-focus in FIGS. 3A and 3E are larger than those in FIGS. 3B and 3D, respectively, and the degrees of the image deformations in FIGS. 3A, 3B, 3D and 3E indicate how the object's image is in a blurred condition.

In FIGS. 3A to 3E, the upper and lower half image sections 16 and 16' correspond to the upper and lower half portions 1 and 1' of the object, and the central line 12' therebeteen indicates that it optically coincides with the interface 12 between both the wedge type prisms 11 and 11'.

Figure 4:
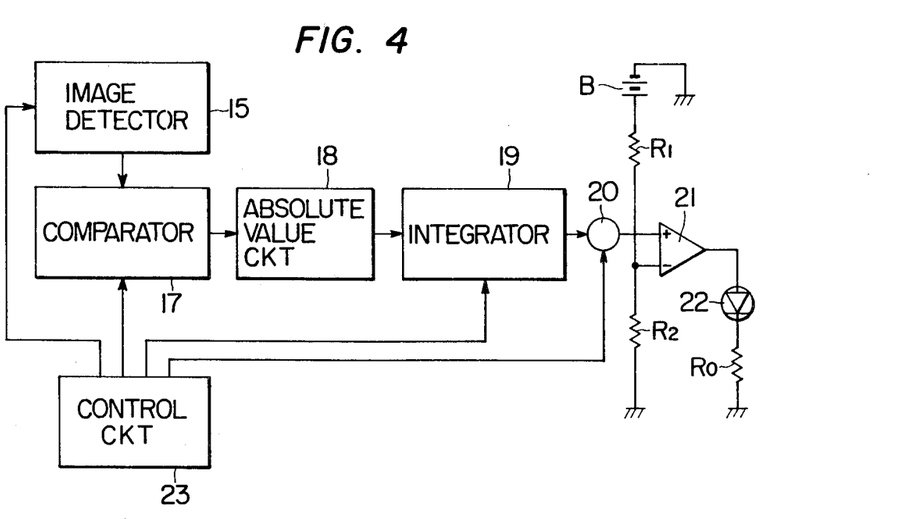
FIG. 4 is a schematic block circuit diagram of a focus detecting system including a focus detecting device in accordance with the present invention.
Figure 5:
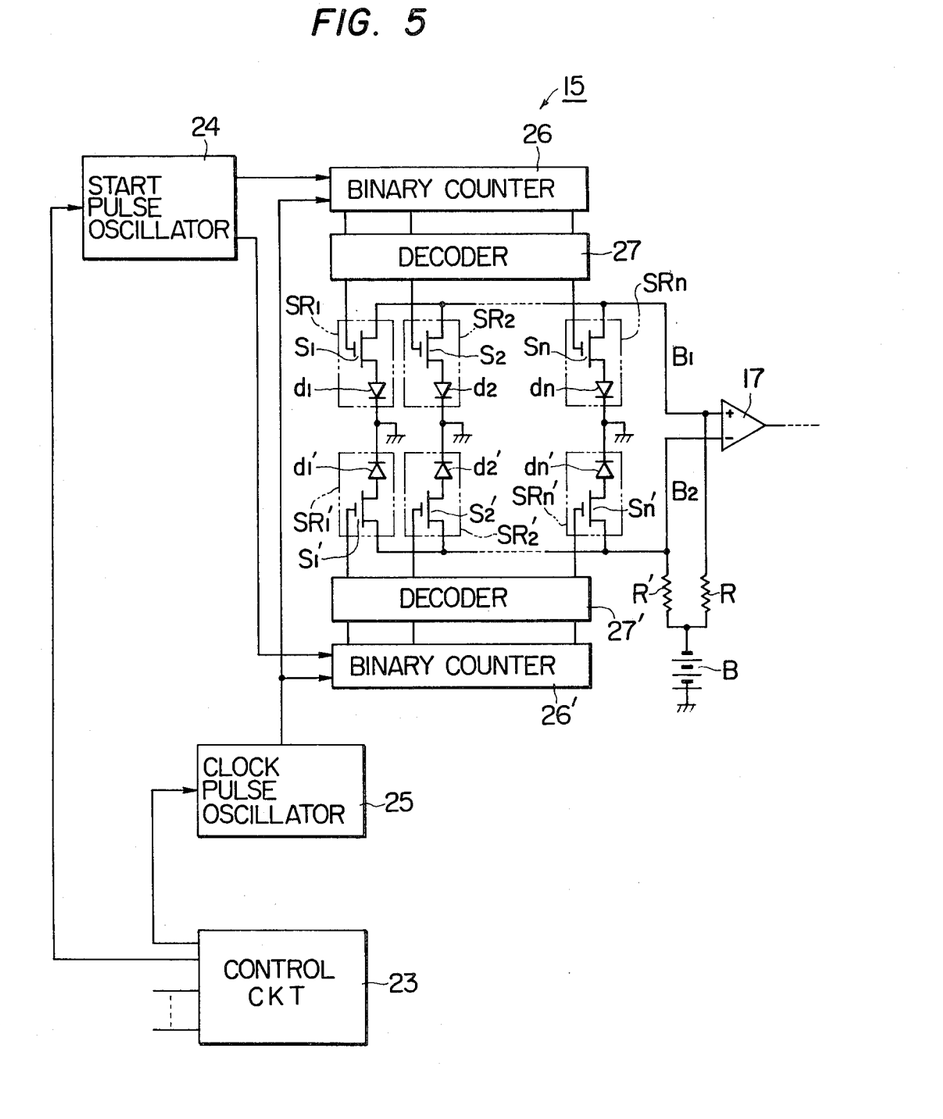
FIG. 5 is a practical circuit arrangement, partly shown in a block diagram, of a focus detecting device according to the present invention.
Figure 8:
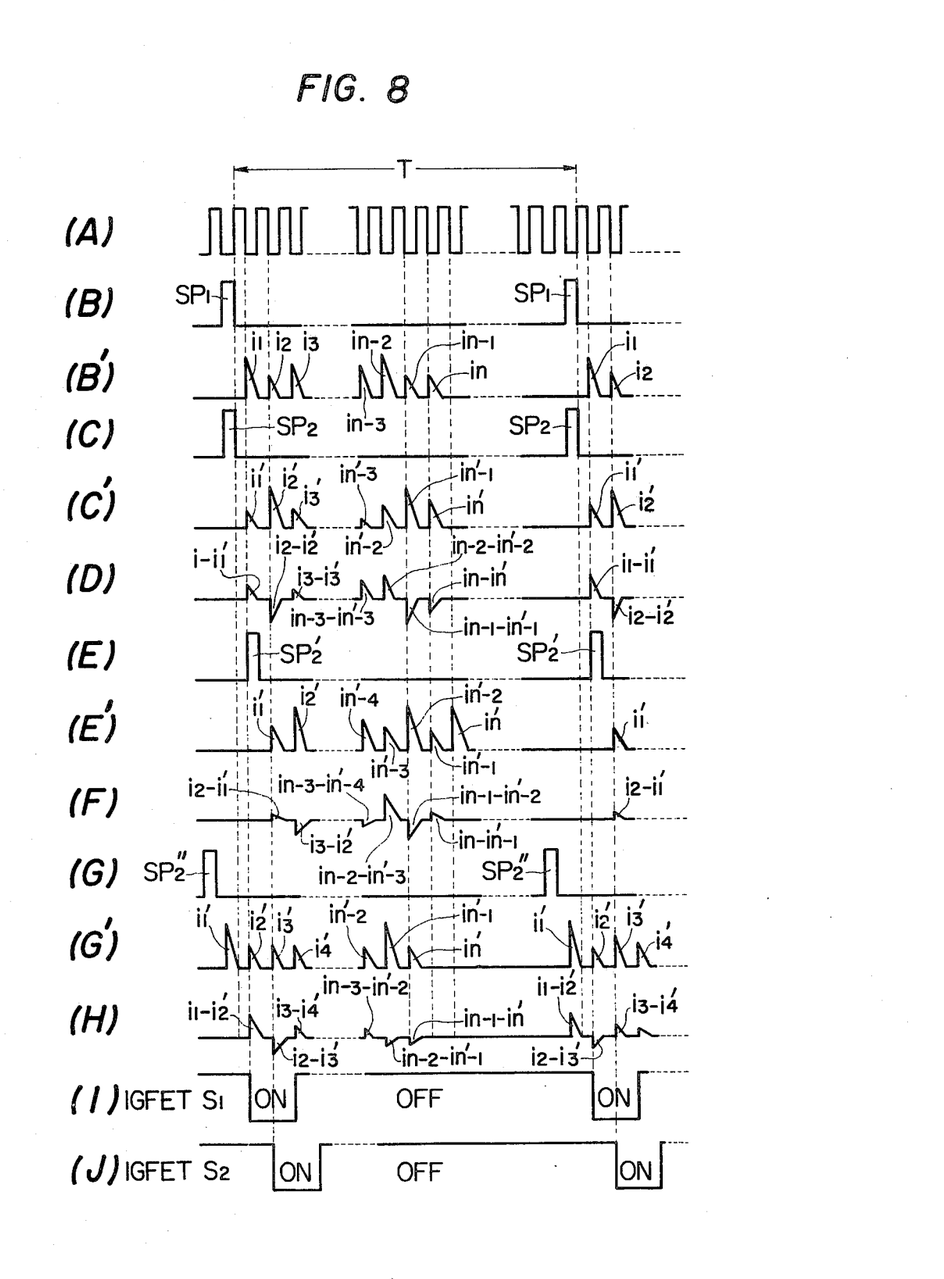
FIGS. 8A to 8J are output waveforms of various circuit portions shown in FIG. 5.

FIG. 4 is a block circuit diagram of a focus detecting system including the image detecting device 15, a practical circuit arrangement of which is shown in FIG. 5, according to the present invention. The image detecting device 15 includes two groups of minute photoelectric conversion elements $d_1, d_2 \ldots d_n$ and $d_1', d_2' \ldots d_n'$ such as photodiodes which are so formed, as shown in FIG. 2, on the semiconductor substrate S that they are aligned in the longitudinal direction with two rows symmetrically juxtaposed with respect to the longitudinal center line 12' therebetween in the most possible proximate relationship to each other, and have the same electrical characteristics and the smallest possible light receiving area. Furthermore, the corresponding photoelectric conversion elements $d_1$ and $d_1'$, $d_2$ and $d_2' \ldots$ and $d_n$ and $d_n'$ constituting said two groups are aligned in the transversal or lateral direction with each other, respectively. Thus, the photoelectric conversion elements $d_1$ to $d_n$ constituting one of said two groups and the photoelectric conversion elements $d_1'$ to $d_n'$ constituting the other group have their cathodes connected to the grounded positive pole of a dc power source B. The anodes of the photoelectric conversion elements $d_1, d_2 \ldots d_n$ constituting said one group are connected to the negative pole of the dc power source B via the main current conduction paths (drain-source paths) of corresponding electrical switching elements $S_1, S_2 \ldots S_n$ such as insulated gate enhancement type P-channel field effect transistors (hereinafter referred to as "IGFET's") each having a small amount of leakage current and via a common load resistor R. Likewise, the anodes of the photoelectric conversion elements $d_1', d_2' \ldots d_n'$ constituting the other group are connected to the negative pole of the dc power source B via the drain-source paths of corresponding P-channel IGFET's $S_1', S_2' \ldots S_n'$ and via a common load resistor R'. On the other hand, a clock pulse oscillator 25 is provided which produces clock pulses having a predetermined fixed or preferably variable frequency (FIG. 8A). Clock pulses produced by the clock pulse oscillator 25 are successively applied to a binary counter 26 having a plurality of binary weighted output terminals starting at the instant when a corresponding start pulse (FIG. 8B) from a start pulse generator 24 is applied to the counter 26, and applied to a binary counter 26' identical in construction to the counter 26 starting at the time when a corresponding start pulse (FIG. 8C, 8E or 8G) from the start pulse generator 24 is applied to the counter 26'. The outputs of the binary counters 26 and 26' are respectively coupled with decoders 27 and 27' each having a plurality of output terminals equal in number to that of the photoelectric conversion elements $d_1$ to $d_n$ or $d_1'$ to $d_n'$ constituting each of said two groups. The respective output terminals of the decoder 27 are connected to the gates of the corresponding IGFET's $S_1$ to $S_n$, and likewise the respective output terminals of the decoder 27' are connected to the gates of the corresponding IGFET's $S_1'$ to $S_n'$. Thus, the common connection of the load resistor R to the drains of IGFET's $S_1$ to $S_n$ is connected to a positive input terminal of a differential type comparator 17, and the common connection of the load resistor R' to the drains of IGFET's $S_1'$ to $S_n'$ is connected to a negative input terminal of the comparator 17.

Reverting to FIG. 4, the output of the comparator 17 is coupled in turn with an absolute value circuit 18, an integrator or an adder 19 and a gate circuit 20. The output terminal of the gate circuit 20 is connected to a positive input terminal of a differential type comparator 21 having a negative input terminal connected to a reference voltage source, e.g., to the common connection between two resistor $R_1$ and $R_2$ connected in series across the dc power source B and constituting a potentiometer. The output terminal of the comparator 21 is connected to ground via a series circuit consisting of an in-focus condition indicator such as a light emitting diode 22 (hereinafter referred to as "LED") and a resistor $R_0$ for adjusting the brightness of LED 22. Thus, a control circuit 23 is provided for controlling the clock pulse oscillator 25, the start pulse generator 24, the comparator 17, the absolute value circuit 18, the integrator 19 and the gate circuit 20 so as to permit them to operate to attain the hereinunder described focus detecting operation in accordance with the present invention utilizing the upper-lower image coincidence method and/or the contrast method.

The focus detecting operation according to the present invention will now be described with reference to FIGS. 1 to 8.

First of all, referring to FIG. 1, the image of the object 1, 1' is formed on the focal plate 5 after passing through the photographing lens 2 and being reflected by the total reflection mirror 3, and observed by the photographer's eye 9 through the condenser lens 6, the pentaprism 7 and the eye piece 8. At the same time, the image of the object 1, 1' is focussed in the proximity of the wedge type prisms 11 and 11' disposed at a position optically equivalent to the film 10 after passing through a portion of the half transparent mirror 3' provided at the central portion of the total reflection mirror 3 and being then reflected by the total reflection mirror 4.

Accordingly, the object's image is split into two images corresponding to the upper half portion 1 and lower half portion 1' of the object by the action of the wedge type prisms 11 and 11'. The two images thus split are projected through the projecting lens 13 in the mutually opposite directions and then focussed, as shown in FIGS. 3A to 3E, on the focus detecting element group 14. When, as is evident to those skilled in the art, the object's image is focussed through the photographing lens 2 on any position Q optically equivalent to the film 10, then no deviation is present between the upper and lower images 16 and 16' split by the wedge type prisms 11 and 11' and projected on the focus detecting element group 14.

Next, it will now be described with reference to FIGS. 3A to 3E how the object's image is projected on the focus detecting element group 14 when the photographing lens 2 is gradually moved in one direction from a complete out-of-focussing position toward an in-focus position, and further toward the opposite out-of-focussing position. First, when the photographing lens 2 is situated at a complete out-of-focussing position, then the upper and lower images 16 and 16' of the object 1, 1' after being split by the wedge type prisms 11 and 11' are projected as shown in FIG. 3A on, e.g., the two (or more) adjacent ones $d_l$ and $d_{l+1}$ of the upper photoelectric conversion elements $d_1$ to $d_n$ and on the two (or more) adjacent ones $d'_{m-1}$ and $d'_m$ of the lower photoelectric conversion elements $d_1'$ to $d_n'$, respectively.

Under this condition, the upper and lower images 16 and 16' of the object are considerably deviated or spaced at the opposite sides of a line corresponding to the interface 12 between the wedge type prisms 11 and 11' so that they are in extremely blurred conditions and the contrast therebetween is very low.

Subsequently, as the photographing lens 2 is moved toward the in-focus condition, the upper and lower images 16 and 16' of the object are projected as shown in FIG. 3B on, e.g., one $d_{j-1}$ of the upper photoelectric conversion elements $d_1$ to $d_n$ and on one $d'_{j+1}$ of the lower photoelectric conversion elements $d_1'$ to $d_n'$ so that the blurred degree thereof and the deviated degree therebetween become smaller and the contrast therebetween becomes higher, than in the case of FIG. 3A. When the photographing lens 2 is further moved in the same direction, the upper and lower images 16 and 16' of the object are brought into focus so that they are projected as shown in FIG. 3C on the central ones $d_j$ and $d_j'$ of the upper and lower photoelectric conversion elements $d_1$ to $d_n$ and $d_1'$ to $d_n'$, respectively. Under this condition, the contrast between the upper and lower object's images 16 and 16' becomes highest and no deviation therebetween is present. When the photographing lens 2 is further moved from the in-focus position (FIG. 3C) toward the out-of-focus position opposite to the case of FIG. 3B or 3A, then the upper and lower object's images 16 and 16' are projected as shown in FIGS. 3D and 3E on one $d_{j+1}$ or the two (or more) adjacent ones $d_{s-1}$ and $d_s$ of the upper photoelectric conversion elements $d_1$ to $d_n$ and on one $d'_{j-1}$ or the two (or more) adjacent ones $d_r'$ and $d'_{r-1}$ of the lower photoelectric conversion elements $d_1'$ to $d_n'$ in the opposite relationship to the case of FIG. 3B or 3A.

The method for electrically detecting the in-focus condition between two object's images split by the effect of the wedge type prisms 11 and 11' utilizing the focus detecting system in accordance with the present invention constructed as shown in FIGS. 4 and 5 will now be described with reference to FIGS. 3A to 3E, 6, 7 and 8A to 8J.

First, for the convenience of explanation, the operation of any one, e.g., of the minute photoelectric focus detecting elements $d_1$ to $d_n$ and $d_1'$ to $d_n'$ will now be described.

Assuming that the clock pulse oscillator 25 produces a train of clock pulses as shown in FIG. 8A and the start pulse generator 24 generates a start pulse $SP_1$ as shown in FIG. 8B under the control of the control circuit 23, the binary counter 26 begins to count the number of clock pulses from the clock pulse oscillator 25 when the start pulse $SP_1$ is produced by the start pulse generator 24 and the IGFET $S_1$ is made conductive (FIG. 8I) by the first output from the decoder 27 coupled to the binary counter 26. Consequently, the corresponding photoelectric conversion element $d_1$ is backward biased to act as a capacitor to charge current flowing from the dc power source B through the load resistor R and the now conducting IGFET $S_1$. Thereafter, during one complete scanning period T in which the succeeding first output is delivered from the decoder 27 subsequent to the second to last outputs therefrom, the IGFET $S_1$ is kept nonconductive to cease the charging operation of the photoelectric conversion element $d_1$.

When, under this condition, light is received by the photoelectric conversion element $d_1$ after being reflected from the object 1, 1' and passing through the focussing lens system including the photographing lens 2, the total reflection mirrors 3, 4, the wedge type prisms 11, 11' and the projecting lens 13, then electrons and holes contained in the photoelectric conversion element $d_1$ are excited to flow therein discharge current proportional to the amount of incident light received thereby and reduce the voltage level charged thereon.

When the IGFET $S_1$ is again rendered conductive by the succeeding first output from the decoder 27, then the charged voltage level on the photoelectric conversion element $d_1$ is again increased.

The aforesaid operation is repeated for each said one complete scanning period T, and the waveform of charging current flowing into the photoelectric conversion element $d_1$ when the corresponding IGFET $S_1$ is made conductive is applied to the corresponding input terminal of the comparator 17.

Thus, the operation for detecting the in-focus condition between two object's images split by the effect of the wedge type prisms 11 and 11' in accordance with the upper-lower image coincidence method will now be described.

In this case, it is only required that start pulses $SP_1$ and $SP_2$ as shown in FIGS. 8B and 8C from the start pulse generator 24 are synchronously applied to both the binary counters 26 and 26' under the control of the control circuit 23 so that both the binary counters 16 and 16' initiate to count the number of clock pulses (FIG. 8A) produced by the clock pulse oscillator 25 in the synchronous relationship with each other. Consequently, when clock pulses as shown in FIG. 8A are successively produced from the clock pulse oscillator 25, then the corresponding ones $S_1$ and $S_1'$, $S_2$ and $S_n'$ . . . or $S_n$ and $S_n'$ of the upper and lower IGFET's $S_1$ to $S_n$ and $S_1'$ to $S_n'$ are always synchronously made conductive through the corresponding binary counter & decoder 26, 27 and 26', 27' so that the corresponding ones $d_1$ and $d_1'$, $d_2$ and $d_2'$ . . . or $d_n$ and $d_n'$ of the upper and lower photoelectric conversion elements $d_1$ to $d_n$ and $d_1'$ to $d_n'$ are synchronously backward biased to charge current from the dc power source B through the corresponding load resistors R and R' and the now conducting corresponding IGFET's $S_1$ and $S_1'$, $S_2$ and $S_2'$ . . . or $S_n$ and $S_n'$. When light is received by the upper and lower photoelectric conversion elements $d_1$ to $d_n$ and $d_1'$ to $d_n'$ as mentioned above, then the voltages charged on the photoelectric conversion elements are discharged in proportional to the amount of incident light received thereby as mentioned above.

Thus, the waveforms $i_1, i_2, i_3, \ldots i_{n-3}, i_{n-2}, i_{n-1}, i_n$ and $i_1', i_2', i_3', \ldots i'_{n-3}, i'_{n-2}, i'_{n-1}, i'_n$ (FIGS. 8B' and 8C') of charging currents flowing into the corresponding pairs of photoelectric conversion elements $d_1$ and $d'_1$, $d_2$ and $d_2'$ . . . and $d_n$ and $d_n'$ from the dc power source B through the corresponding load resistors R and R' and the conducting corresponding pairs of IGFET's $S_1$ and $S_1'$, $S_2$ and $S_2'$ . . . and $S_n$ and $S_n'$ are successively applied to the corresponding input terminals of the comparator 17. As a result, the comparator 17 operates to produce the differences $(i_1-i_1')$, $(i_2-i_2')$ . . . and $(i_n-i_n')$ (see FIG. 8D) between the aforesaid charging currents $i_1$ to $i_n$ and $i_1'$ to $i_n'$ successively flowing into the corresponding parts of photoelectric conversion elements $d_1$ and $d_1'$, $d_2$ and $d_2'$ ... and $d_n$ and $d_n'$ as mentioned above, the absolute value circuit operates to produce the absolute values $|i_1-i_1'|$, $|i_2-i_2'|$ ... and $|i_n-i_n'|$ of output signals derived from the comparator 17, and the integrator 19 operates to obtain the sum $\epsilon$ of the absolute values derived from the absolute value circuit 18, i.e., $$\epsilon = \sum_{q=1}^{n} |i_q - i_q'|.$$

Thus, the sums $\epsilon(a)$, $\epsilon(b)$, $\epsilon(c)$, $\epsilon(d)$ and $\epsilon(e)$ of the absolute values derived from the integrator 19 in accordance with the cases of FIGS. 3A to 3E would be expressed, as is evident from the foregoing description, by the following formulas, respectively:

$$\epsilon(a) = \sum_{q=1}^{n} |i_q - i_q'| = \ldots + |i_l - i_l'| + |i_{l+1} - i'_{l+1}| \quad (1) \text{ (FIG. 3A)}$$
$$+ \ldots + |i_{m-1} - i'_{m-1}| + |i_m - i_m'| \ldots > 0$$

$$\epsilon(b) = \sum_{q=1}^{n} |i_q - i_q'| = |i_{j-1} - i'_{j-1}| + |i_{j+1} - i'_{j+1}| > 0 \quad (2) \text{ (FIG. 3B)}$$

$$\epsilon(c) = \sum_{q=1}^{n} |i_q - i_q'| = 0 \quad (3) \text{ (FIG. 3C)}$$

$$\epsilon(d) = \sum_{q=1}^{n} |i_q - i_q'| = |i_{j-1} - j_{j-1}| + |i_{j+1} - i'_{j+1}| > 0 \quad (4) \text{ (FIG. 3D)}$$

$$\epsilon(e) = \sum_{q=1}^{n} |i_q - i_q'| = \ldots + |i_{r-1} - i'_{r-1}| + |i_r - i_r'| \quad (5) \text{ (FIG. 3E)}$$
$$+ |i_{s-1} - i'_{s-1}| + |i_s - i_s'| \ldots > 0$$

In formulas (1) to (5), it should be noted that the differences between output currents derived from those of the corresponding pairs of upper and lower photoelectric conversion elements $d_1$ and $d_1'$, $d_2$ and $d_2'$ ... and $d_n$ and $d_n'$ on which the object's images 16 and 16' split by the wedge type prisms 11 and 11' are not projected through the projecting lens 13 are substantially zero, respectively.

Accordingly, the relationship of $\epsilon(a)$, $\epsilon(b)$, $\epsilon(d)$, $\epsilon(e) > =0$ is obtained. For this reason, when the upper-lower image coincidence method is utilized, then the infocus condition of the object's images 16 and 16' onto the two groups of photoelectric conversion elements $d_1$ to $d_n$ and $d_1'$ to $d_n'$ can be detected by detecting when the output $\epsilon$ of the integrator 19 becomes smallest or zero in the most preferable condition.

However, the output level $\epsilon$ of the integrator 19 at the time of the in-focus condition does not practically become zero because the electrical characteristics between the respective corresponding pairs of upper and lower photoelectric conversion elements $d_1$ and $d_1'$, $d_2$ and $d_2'$ ... and $d_n$ and $d_n'$ generally somewhat differ from each other, but has a certain value $\epsilon_0$ ($\epsilon_0 > 0$).

In addition, the relationships of $i_l \approx i_l'$ ... $i_m \approx i_m'$ ... $i_r = i_r'$ ... $i_s = i_s'$ stand in the cases of FIGS. 3A and 3E where the contrasts between the upper and lower object's images 16 and 16' are extremely low and the object's images are in extremely blurred conditions. Therefore, it is considerably difficult always to detect the in-focus condition by utilizing only the upper-lower image coincidence method, particularly in the case where the depth of field is not fully obtained.

Figure 6:
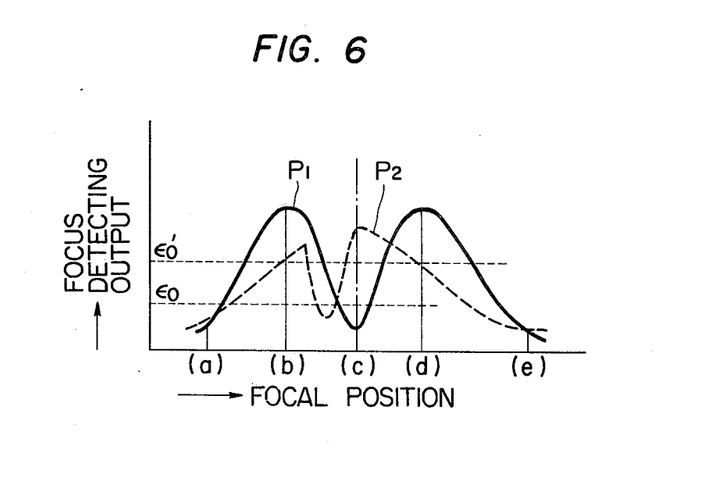
FIGS. 6 and 7 are graphical representations indicating the relationships between the focus position on two groups of photoelectric conversion elements and the focus detection output therefrom.

A solid curve $P_1$ of FIG. 6 shows a variation characteristic of the output level $\epsilon$ of the integrator 19 obtained in accordance with the upper-lower image coincidence method.

As will be apparent from the solid curve $P_1$, it is indicated that the contrasts between the upper and lower object's images 16 and 16' in the cases of FIGS. 3B and 3D are considerably high and the outputs $\epsilon$ of the integrator 19 have the highest values. In FIG. 6, focal points (a), (b), (c), (d) and (e) correspond to the cases of FIGS. 3A, 3B, 3C, 3D and 3E, respectively.

Taking the aforesaid circumstance into the consideration, the present invention may be characterized by detecting the in-focus condition of the object's images 16 and 16' formed onto the upper and lower photoelectric conversion elements $d_1$ to $d_n$ and $d_1'$ to $d_n'$ utilizing both the above-mentioned upper-lower image coincidence method and the hereinunder described contrast method.

Namely, when the in-focus condition of the objects images 16 and 16' onto the two groups of photoelectric conversion elements $d_1$ to $d_n$ and $d_1'$ to $d_n'$ to be detected by the contrast method, then it is only required that, under the control of the control circuit 23, the binary counter 26 is controlled to began to count the number of clock pulses produced from the clock pulse oscillator 25 at the instant when the start pulse $SP_1$ as shown in FIG. 8B is produced from the start pulse generator 24, and the binary counter 26' is controlled to start to count the number of clock pulses produced from the clock pulse oscillator 25 at the time when a start pulse $SP_2'$ or $SP''$ (FIG. 8E or 8G) delayed or advanced by one (or more) clock pulse duration to the start pulse $SP_1$ applied to the binary counter 26 is produced from the start pulse generator 24. In this case, it will be apparent to those skilled in the art that the output $\epsilon'$ of the integrator 19 is obtained in the form of $$\epsilon' = \sum_{q=1}^{n-1} |i_q - i'_{q+1}| \text{ or } \epsilon' = \sum_{q=1}^{n-1} |i_{q+1} - i'_q|.$$

A dotted curve $P_2$ of FIG. 6 shows a variation characteristic of the output level $\epsilon'$ of the integrator 19 obtained in accordance with the contrast method. As is evident from the dotted curve $P_2$, the output $\epsilon'$ of the integrator 19 has the highest value in the case where the object's images 16 and 16' projected onto the upper and lower photoelectric conversion elements $d_1$ to $d_n$ and $d_1'$ to $d_n'$ are brought into focus. On the dotted curve $P_2$, the drop of the output $\epsilon'$ of the integrator 19 between the focal positions (b) and (c) is because the relative deviation between the upper photoelectric conversion element $i_q$ or $i_{q+1}$ and the lower photoelectric conversion element $i'_{q+1}$ or $i_q'$ is close to zero.

Thus, as will be evident from FIG. 6, it is desired to detect the in-focus condition of the object's images 16 and 16' formed on the upper and lower photoelectric conversion elements $d_1$ to $d_n$ and $d_1'$ to $d_n'$ by obtaining the focal position satisfying the relationships that the output $\epsilon$ of the integrator 19 in the case of the upper-lower image coincidence method is smaller than the aforesaid value $\epsilon_o$ and the output $\epsilon'$ of the integrator 19 in the case of the contrast method is larger than a certain value $\epsilon_o'$, particularly in the case where the depth of field is not fully obtained.

Next, the method for detecting the in-focus condition of the object's images 16 and 16' formed on the two groups of photoelectric conversion elements $d_1$ to $d_n$ and $d_1'$ to $d_n'$ by utilizing only the contrast method will now be described with reference to FIG. 7. Namely, an approximate contrast method is applicable to detect the in-focus condition of the aforesaid object's images 16 and 16′ possessing appropriate resolutions by utilizing the relationship between the photoelectric conversion elements displaced by P(P=1,2,3, ....n−1) from each other. More specifically, in this case, it is only required to operate the circuitry of FIg. 5 to obtain the outputs $\epsilon_2$ and $\epsilon_2'$ of the integrator 19 as expressed by the formulas $$\epsilon_2 = \sum_{q=1}^{n-1} |i_q - i'_{q+p}| \text{ and } \epsilon_2' = \sum_{q=1}^{n-p} |i'_q - i_{q+p}|.$$

Hence, it will be understood by those skilled in the art where the P is equal to 1 is most suitable for the contrast method.

Figure 7:
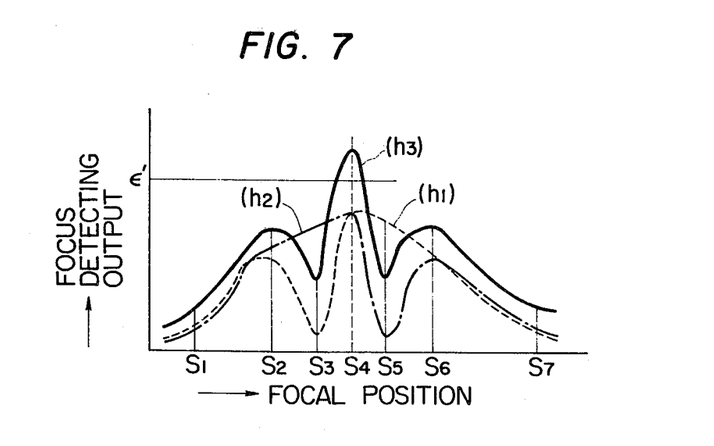

Thus, a curve $h_1$ of FIG. 7 shows the output $\epsilon_2$ of the integrator 19 and a curve $h_2$ of FIG. 7 indicates the output $\epsilon_2'$ of the integrator 19. On the curve $h_1$, a focal position $S_1$ indicates a complete out-of-focus position and the contrast between the object's images 16 and 16′ is extremely low.

For this reason, a large possibility of obtaining the relationships of $i_1 \approx i'_{1+p}$ . . . and $i_t \approx i'_{t+p}$ (where t+p=n) is present and the output $\epsilon_2$ of the integrator 19 is close to zero. A focal position $S_2$ indicates a position closer to the in-focus position than the position $S_1$ and the contrast between the object's images 16 and 16′ becomes higher than in the position $S_1$ and the output level $\epsilon_2$ of the integrator 19 due to the relative deviation between the aforesaid photoelectric conversion elements $i_q$ and $i'_{q+p}$ becomes extremely high. A focal position $S_3$ indicates a position closer to the in-focus position than the position $S_2$, but the relative deviation therebetween becomes equivalently zero and the output $\epsilon_2$ of the integrator 19 substantially becomes zero.

A focal position $S_4$ indicates the in-focus position between the object's images 16 and 16′, the contrast between the aforesaid elements $i_q$ and $i'_{q+p}$ becomes highest and the relative deviation therebetween becomes almost zero, but the output $\epsilon_2$ of the integrator 19 does not become zero but becomes rather highest because of the condition $P \geq 1$.

A focal position $S_5$ indicates a position out-of-focus in the opposite direction to the position $S_3$, and the output $\epsilon_2$ of the integrator 19 becomes smaller than the in-focus position $S_4$ due to lowering of the contrast and the relative deviation between the aforesaid elements $i_q$ and $i'_{q+p}$. And, focal positions $S_6$ and $S_7$ indicate positions out-of-focus and reversed with the positions $S_2$ and $S_1$ relative to the in-focus position $S_4$, the contrasts and the relative deviations between the elements $i_q$ and $i'_{q+p}$ become progressively lower and larger, respectively, and the outputs $\epsilon_2$ of the integrator 19 become gradually smaller.

The curve $h_2$ of FIG. 7 has substantially the same characteristics as the curve $h_1$, by replacing the positions $S_1, S_2, S_3, S_4, S_5, S_6$ and $S_7$ of the curve $h_1$ with the positions $S_7, S_6, S_5, S_4, S_3, S_2$ and $S_1$.

A curve $h_3$ of FIG. 7 indicates the sum of the curves $h_1$ and $h_2$, i.e., the output $\epsilon_3$ of the integrator 19 satisfying the formula $$\epsilon_3 = \epsilon_2 + \epsilon_2' = \sum_{q=1}^{n-p} |i_q - i'_{q+p}| + \sum_{q=1}^{n-p} |i'_q - i_{q+p}|.$$

Accordingly, in this case, the output $\epsilon_3$ of the integrator 19 becomes highest at the in-focus position $S_4$ and therefor it can easily detect the in-focus condition by only the contrast method.

It should be noted that the present invention is not limited by the embodiment described herein but may be practised by variations and modifications common in the technical scope to the invention.

What we claim is:

1. A focus detecting device for use in a camera including first and second groups of photoelectric focus detecting elements symmetrically juxtaposed on a substrate so as to have the same electrical characteristics and light receiving area for receiving light reflected from an object to be photographed through an optical focussing lens system of the camera, the improvement comprising:
   a d.c. power source;
   a first common load resistance element;
   a first group of electrical switching elements having input, output and gate terminals, each of said switching elements being connected in series with a corresponding focus detecting element in said first group of focus detecting elements and all of the output terminals of said first group of switching elements being connected together and coupled to one terminal of said first common load resistance, the other terminal of which is coupled to said power source;
   a second common load resistance;
   a second group of electrical switching elements having input, output and gate terminals, each of said second group of switching elements being connected in series with a corresponding focus detecting element in said second group of focus detecting elements and all of the output terminals of said second group of switching elements being connected together and coupled to one terminal of said second common load resistance, the other terminal of which is coupled to said power source,
   trigger pulse generating means having a plurality of output terminals coupled to the gates of said electrical switching elements, and producing a train of sequential trigger pulses capable of independently triggering the two groups of focus detecting elements;
   comparison means having two input terminals coupled with the common connection of one of the load resistors to one group of the photoelectric focus detecting elements and the common connection of the other load resistor to the other group of the photoelectric focus detecting elements; and
   means for detecting the focus condition of the object's image formed through the optical focussing lens system on both the groups of photoelectric focus detecting elements in accordance with an output signal from the comparison means.

2. A focus detecting device defined in claim 1, wherein the trigger pulse generating means comprises: a clock pulse oscillator for generating clock pulses of a predetermined frequency; and first and second independently operable binary counter & decoder circuits, the first binary counter and decoder circuit being coupled between the clock pulse oscillator and one the first group of electrical switching elements and the second binary counter and decoder circuit being coupled between the clock pulse oscillator and the second group of electrical switching elements.

3. A focus detecting device defined in claim 2, characterized by further comprising a start pulse generator coupled to the binary counter & decoder circuits and producing start pulses capable of independently controlling the operation starts thereof.

4. A focus detecting device defined in claim 2, wherein the clock pulse oscillator is of a variable frequency type.

5. A focus detecting device defined in claim 1, wherein the two groups of electrical switching elements comprise insulated gate enhancement type field effect transistors.

6. A focus detecting device defined in claim 1, wherein said comparison means comprises a differential type comparator.

7. A focus detecting device defined in claim 1, wherein said means for detecting comprises an absolute value circuit coupled with said comparison means to produce the absolute value of an output signal derived therefrom; an integrator coupled with said absolute value circuit to integrate with a lapse of time the absolute value derived therefrom; a normally open type gate circuit means coupled with said integrator to close-circuit after a predetermined lapse of time starting at the operation start of said integrator; another comparison circuit means having one input terminal coupled with said integrator and the other input terminal coupled with a reference voltage source; and focus condition indicator means coupled with said other comparison means.

8. A focus detecting device defined in claim 7, wherein said focus condition indicator means comprises a light emitting diode.

* * * * *